(12) United States Patent
Grabner (10) Patent No.: US 11,149,901 B2
(45) Date of Patent: Oct. 19, 2021

(54) TRIPOD

(71) Applicant: INVEO OG, Grieskirchen (AT)

(72) Inventor: Martin Grabner, Grieskirchen (AT)

(73) Assignee: INVEO OG, Grieskirchen (AT)

( * ) Notice: Subject to any disclaimer, the term of this patent is extended or adjusted under 35 U.S.C. 154(b) by 38 days.

(21) Appl. No.: 16/607,589

(22) PCT Filed: Apr. 18, 2018

(86) PCT No.: PCT/EP2018/059930
§ 371 (c)(1),
(2) Date: Oct. 23, 2019

(87) PCT Pub. No.: WO2018/202425
PCT Pub. Date: Nov. 8, 2018

(65) Prior Publication Data
US 2020/0149679 A1   May 14, 2020

(30) Foreign Application Priority Data

May 3, 2017   (AT) .............................. A 50360/2017

(51) Int. Cl.
*F16M 11/28* (2006.01)
*F16H 1/16* (2006.01)
(Continued)

(52) U.S. Cl.
CPC .............. *F16M 11/28* (2013.01); *F16H 1/16* (2013.01); *F16M 11/16* (2013.01); *F16M 11/245* (2013.01); *F16M 2200/027* (2013.01)

(58) Field of Classification Search
CPC ...... F16M 11/28; F16M 11/16; F16M 11/245; F16M 2200/027; F16M 2200/02; F16M 11/30; F16H 1/16
(Continued)

(56) References Cited

U.S. PATENT DOCUMENTS 2,750,141 A * 6/1956 Herrmann .............. F16M 11/08
248/414
2,832,555 A * 4/1958 Terhune ............... H01Q 1/1235
248/170
(Continued)

FOREIGN PATENT DOCUMENTS

CN  201440199     4/2010
CN  202937981     5/2013
(Continued)

OTHER PUBLICATIONS

Int'l Search Report (Form PCT/ISA/210) conducted in Int'l Appln. No. PCT/EP2018/059930 (Aug. 7, 2018) (w/ English translation).
(Continued)

*Primary Examiner* — Muhammad Ijaz
(74) *Attorney, Agent, or Firm* — Greenblum & Bernstein, P.L.C.

(57) ABSTRACT

Tripod having a tripod head, a shaft, having telescopic shaft parts, attached to the tripod head via a locking mechanism, and at least three support legs mounted so as to be outwardly pivotably on the shaft. The support legs are connected to the tripod head via pulling members which can be wound up and unwound by a coil arranged rotatably on the tripod head and can be tensioned by a tensioning element. It is proposed that the coil is provided with a return spring acting in the winding direction of rotation of the coil, and a coupling mechanism is provided which can be transferred with an operating element from a rotation mode, in which the coil can be rotated in an unwinding direction of rotation and by the return spring in a winding direction of rotation, into a tensioning mode, in which the coil is locked with respect to the pulling members and the pulling members can be tensioned by the tensioning element.

13 Claims, 7 Drawing Sheets

(51) Int. Cl.
*F16M 11/16* (2006.01)
*F16M 11/24* (2006.01)

(58) Field of Classification Search
USPC ...................................................... 248/178.1
See application file for complete search history.

(56) References Cited

U.S. PATENT DOCUMENTS

| | | | | | |
|---|---|---|---|---|---|
| 4,832,296 | A | * | 5/1989 | Schnepp | ............... G01C 15/004 |
| | | | | | 248/168 |
| 5,003,328 | A | * | 3/1991 | Gaynor | .................. F16M 11/08 |
| | | | | | 248/169 |
| 5,786,854 | A | * | 7/1998 | Slade | ..................... F16M 11/18 |
| | | | | | 348/373 |
| 6,035,968 | A | * | 3/2000 | Morales | ................ A01M 31/02 |
| | | | | | 182/116 |
| 8,505,867 | B2 | * | 8/2013 | Conrad | .................... H01Q 1/12 |
| | | | | | 248/431 |
| 2020/0149679 | A1 | * | 5/2020 | Grabner | ............... F16M 11/245 |

FOREIGN PATENT DOCUMENTS

| | | |
|---|---|---|
| CN | 204737508 | 11/2015 |
| CN | 106594478 | 4/2017 |
| DE | 677 435 | 6/1939 |
| DE | 24 53 095 | 5/1976 |
| FR | 2 459 533 | 1/1981 |

OTHER PUBLICATIONS

Translation of China Search Report conducted in counterpart China Appln. No. 201880038315.1 (dated Jan. 19, 2021).

* cited by examiner

TRIPOD

The invention relates to a tripod having a tripod head for fastening equipment and a shaft fastened to the tripod head, which shaft is formed from at least two telescopically extendable and collapsible shaft parts and can be locked in adjustable lengths by means of a locking mechanism, as well as at least three support legs pivotably mounted on the shaft, wherein the support legs have pulling members which can be wound up and unwound by means of a rotatably arranged coil and can be tensioned by means of a tensioning element, according to the preamble of claim 1.

As is well known, a tripod is used for the stable installation of equipment such as cameras, lamps, microphones, laboratory equipment or measuring instruments. In the conventional way, the tripod is designed as a tripod with three telescopic legs that are arranged to be outwardly pivotable at the tripod head. Each telescopic leg can be locked in adjustable lengths by means of a locking mechanism. A pivot head can then be mounted on a tripod connection of the tripod head, on which the equipment is attached and with which the equipment can be pivoted relative to the tripod.

The construction of a tripod is time-consuming because each telescopic leg has to be swung out, extended individually and locked in the desired length. In addition, the three telescopic legs in the collapsed state result in a high packing size and a comparatively high weight.

If a single, central telescopic tube is used instead, on which three legs are mounted so that they can be moved and swung out, the packing size and weight can be reduced, but the stability of the installation suffers, in particular the telescopic tube tends to bend under the load of the equipment mounted on it or also under external loads such as a wind load.

Therefore, DE 677 435 proposed the use of a central telescopic tube to tension the tripod head with the support legs using pulling members such as wires, cords, chains and the like.

Each support leg is assigned a pulling member, which is stretched from the tripod head outside the telescopic tube to the relevant support leg, where it is guided into the interior of the relevant support leg via a deflection roller and is guided to the tripod head via further deflection rollers inside the telescopic tube, where it can be wound and unwound on a roller. The tensioning of the pulling members takes place via a tensioning element, which is designed as a rotating ring handle arranged on the tripod head.

However, such a configuration is structurally complex and in turn increases the packing size and weight of the tripod. In addition, the large number of rollers and the corresponding pulling member mechanism tend to become jammed, especially in the event of dirt and vibration.

It is therefore the object of the invention to form a tripod with central telescopic tube in a structurally simple way, with comparatively low weight and a small packing size when pushed together, but still to ensure a high stability of the installation.

These objects are achieved through the features of claim 1. Claim 1 relates to a tripod having a tripod head for fastening equipment and a shaft which is fastened to the tripod head, is formed from at least two telescopically extendable and collapsible shaft parts and can be locked in adjustable lengths by means of a locking mechanism, and at least three support legs which are mounted to be outwardly pivotable on the shaft, wherein the support legs having pulling members which can be wound up and unwound by means of a rotatably arranged coil and can be tensioned by means of a tensioning element. According to the invention, it is proposed that the coil is provided with a return spring acting in the winding direction of rotation of the coil, and a coupling mechanism is provided which can be transferred with an operating element from a rotation mode, in which the coil can be rotated by the pulling action of the pulling members in an unwinding direction of rotation and by the return spring in a winding direction of rotation, into a tensioning mode, in which the coil is locked with respect to the pulling members and the pulling members can be tensioned by means of the tensioning element.

The features according to the invention allow on the one hand structurally simple embodiments with low weight and packing size and on the other hand a quick and stable installation as well as height adjustment of the tripod. Only the operating element has to be adjusted so that the coupling mechanism is in rotation mode. In this state, the central telescopic tube can be extended by a simple and rapidly executable movement, wherein the pulling action of the pulling members, which are connected to the support legs on the one hand and the tripod head on the other hand, unwinds the coil against the restoring force of the return spring. The support legs which initially rest against the shaft pivot outwardly and finally reach an end position defined by a stop. Once the central telescopic tube has been adjusted to the desired length, the coupling mechanism can be moved into tensioning mode using the control panel. The coil is locked against the tensioning elements so that the tensioning elements can be tensioned with the aid of the tensioning element. The tripod head is thus clamped to the support legs, which allows a stable tripod-shaped setup to be achieved. It is also possible to keep the legs in a position close to the shaft when the telescopic tube is extended and then to lock the coil in tensioning mode to allow the tripod to be used as a monopod or selfie stick. To disassemble the tripod, the coupling mechanism only needs to be switched to the rotating mode by means of the operating element, which unlocks the coil against the pulling members and subjects the coil to the resetting action of the return spring. The telescopic tube can now be pushed in, wherein the pulling members are wound back onto the coil using the return spring. In the retracted position, the coupling mechanism can be returned to tensioning mode using the operating element to ensure safe storage of the tripod. A coil can be a coil with three coaxially arranged receptacles for the pulling members with the same, usually vertical axis of rotation, or a coil structure with one coil each for each of the pulling members, for example with a horizontal axis of rotation, which are thus not arranged coaxially, but which mesh with a common, central coil element, for example via a bevel gear. In such a coil arrangement, the component referred to below as the "coil" is understood to be the common, central coil element.

Preferably, in the tensioning mode, the pulling members can be tensioned by means of a tensioning element acting in the winding direction of rotation of the coil. In particular, it is proposed that the tensioning element be designed as an actuating lever for a shaft provided with at least one helical gear meshing with a gearwheel, wherein the gearwheel is arranged coaxially with the coil. Such a gear is also called a worm gear, wherein the shaft provided with at least one screw thread is also called a worm and the gearwheel is called a worm gear. The axes of the worm and worm gear are usually offset by 90°. Such a worm gear has the advantage of self-locking, which occurs due to the sliding friction between worm and worm gear. With the aid of the actuating lever, a torque can thus be exerted on the worm gear, but a torque exerted by the worm gear hardly causes the worm to move.

Preferably, the gear formed by the shaft with at least one helical gear and the gearwheel is a globoidal worm gear. In a globoidal worm gear, the worm has a globoidal shape and the worm gear is cylindrical so that the worm gear can be moved axially. This embodiment gives the structure advantages that will become apparent later.

In particular, the coupling mechanism can be designed in such a way that it comprises a first coupling part, which is fastened to the coil, and a second coupling part, which is fastened to the gearwheel and is axially displaceable with the gearwheel along the coil axis, wherein the second coupling part is spaced apart from the first coupling part in the rotation mode and can be transferred by means of the operating element against the restoring force of a restoring element into the tensioning mode, in which the second coupling part rests positively or non-positively against the first coupling part. The axial displaceability of the worm gear allows the worm gear to be easily switched from rotary to tensioning mode, wherein, in the tensioning mode, a torque can be applied to the worm gear and thus to the coil by means of the actuating lever, which winds the pulling members onto the coil and thus tensions it. Although the pulling action of the pulling members exerts a counter-rotating torque on the coil and thus on the worm gear, this is not transmitted to the worm and thus to the actuating lever due to the self-locking of the worm gear. The positive or non-positive contact between the first and second coupling parts can be achieved, for example, by means of axial meshing of the two coupling parts, which meshes in tensioning mode.

The operating element can be designed as an operating lever separate from the actuating lever. In this case the operation of the coupling mechanism and the tensioning of the pulling members must be carried out by means of two operations. Preferably, however, it is proposed that an eccentric disk is arranged coaxially to the shaft provided with at least one screw thread, which eccentric disk is rotatable with the actuating lever and rests with its circumferential region against the second coupling part or can be brought into abutment with the second coupling part when the actuating lever is pivoted, wherein by pivoting the actuating lever and the rotational movement of the eccentric disk produced thereby, the second coupling part can be brought from a distance from the first coupling part which corresponds to the rotational mode into a positive or non-positive connection with the first coupling part which corresponds to the tensioning mode. With this embodiment it is achieved that the actuating lever is now also the operating element with the aid of the eccentric disk. The spacing of the second coupling part from the first coupling part corresponds to the rotation mode, and the positive or non-positive connection of the second coupling part with the first coupling part corresponds to the tensioning mode, in which the pivoting movement of the actuating lever causes a tensioning or relief movement for the pulling members. A first pivoting range of the actuating lever, in which the second coupling part is spaced apart from the first coupling part, may also be assigned to the rotation mode, and a second pivoting range of the actuating lever, in which the first and second coupling parts are in positive or non-positive engagement, may be assigned to the tensioning mode. In this way, it is possible to switch between rotation mode and tensioning mode as well as to tension the pulling members by simply actuating the actuating lever. The operation of the tripod is thus greatly simplified.

An additional simplification is achieved in that the shaft parts of the telescopic tripod can also be locked from the tripod head. For this purpose, it is first proposed that the coil be arranged coaxially to the shaft axis. Such an embodiment is particularly advantageous if a locking mechanism is provided for the shaft which can be actuated by rotating the shaft parts about their shaft axis. For such a locking mechanism it may be preferred that a locking element causing the rotation of shaft parts about their shaft axis is arranged on the tripod head, in particular the locking element may be the actuating lever. When the actuating lever is pivoted, a rotation of the worm is produced, which can now be used to bring about a relative rotation of the shaft parts around their shaft axis and thus to operate the locking mechanism.

For this purpose, a new design of the telescopically extendable and collapsible shaft is proposed. This new design is characterized in that the shaft comprises an inner telescopic assembly formed from inner shaft parts and an outer telescopic assembly formed from telescopically extendable and telescopically collapsible outer shaft parts and mutually rotationally fixed outer shaft parts, wherein the inner telescopic assembly is disposed within the innermost shaft part of the outer telescopic assembly, and the locking mechanism comprises clamping elements which are each rotationally fixedly connected to the inner shaft parts and frictionally engageable with an inner surface of an outer shaft part in a locking direction of rotation about the shaft axis. The inner telescopic assembly can be rotated relative to the outer telescopic assembly around the common shaft axis. If the inner telescopic assembly consists of at least two inner shaft parts that can be telescopically pulled out and pushed together, these inner shaft parts are also connected to each other in a rotationally fixed manner. If, for example, the outermost shaft part of the inner telescopic assembly is rotated about the shaft axis, the entire inner telescopic assembly rotates relative to the shaft parts of the outer telescopic assembly due to the rotationally fixed connection of the inner shaft parts. This rotary movement can be used to bring clamping elements, which are connected to the inner shaft parts in a rotationally fixed manner, into a frictional engagement with an inner surface of an outer shaft part in a locking direction around the shaft axis. Each of the shaft parts of the inner telescopic assembly is provided with a clamping element which can be brought into frictional engagement with a shaft part of the outer telescopic assembly assigned to it.

At this point it should be mentioned that with a particularly simple embodiment it would be conceivable that the outer telescopic assembly only comprises two shaft parts. In this case a single part of the shaft for the inner telescopic assembly can be used to find the required length.

In addition, it is preferably proposed that such a clamping element, which can be brought into frictional engagement with an inner surface of an outer shaft part, is attached to the closest inner outer shaft part so that it can rotate about the shaft axis. The two telescopic assemblies are usually pushed out and pushed together by the outer telescopic assembly. If the shaft parts of the outer telescopic assembly are displaced axially, the clamping elements and thus the shaft parts of the inner telescopic assembly are also moved. However, the clamping elements can still rotate relative to the closest inner outer shaft part during a locking rotational movement produced by the shaft parts of the inner telescopic assembly.

With regard to the design of the clamping elements, it is preferably proposed that the inner surfaces of the outer shaft parts are convexly curved outwards and that the clamping elements are each designed as eccentric clamping elements with convex circumferential regions which can be brought into frictional engagement with the inner surface of an outer shaft part in a locking direction of rotation about the shaft axis and can be released again in the opposite direction of rotation. The clamping element is formed approximately disk-shaped and has convex eccentric areas in its circumference, which run between a minimum and a maximum diameter, measured from the shaft axis. The clamping element can be formed by about six sectors according to an embodiment described in more detail below, wherein three sectors are designed as circular sectors whose circular arcs lie on an inner circle and three sectors have an arc which lies outside the inner circle and whose distance to the center of the inner circle varies from a minimum to a maximum distance to form the convex eccentric regions.

The convex inner surfaces of the outer shaft parts can be designed in such a way that they appear triangular in cross-section with outwardly bent sides, which can be described by circular arcs whose diameter is larger than the maximum diameter of the clamping element. In borderline cases, the curvature can therefore also disappear, so that the inner surfaces of the outer shaft parts appear triangular in cross-section. The minimum distance of an inner surface of an outer shaft part from the shaft axis is in any case greater than the minimum diameter and smaller than the maximum diameter of the eccentric areas of the clamping element. When the clamping element is rotated about the shaft axis, this creates a frictional connection with the inner surface of the outer shaft part.

The invention will be explained in more detail in the following by means of embodiment examples using the enclosed drawings, wherein.

Figures 1A, 1B:
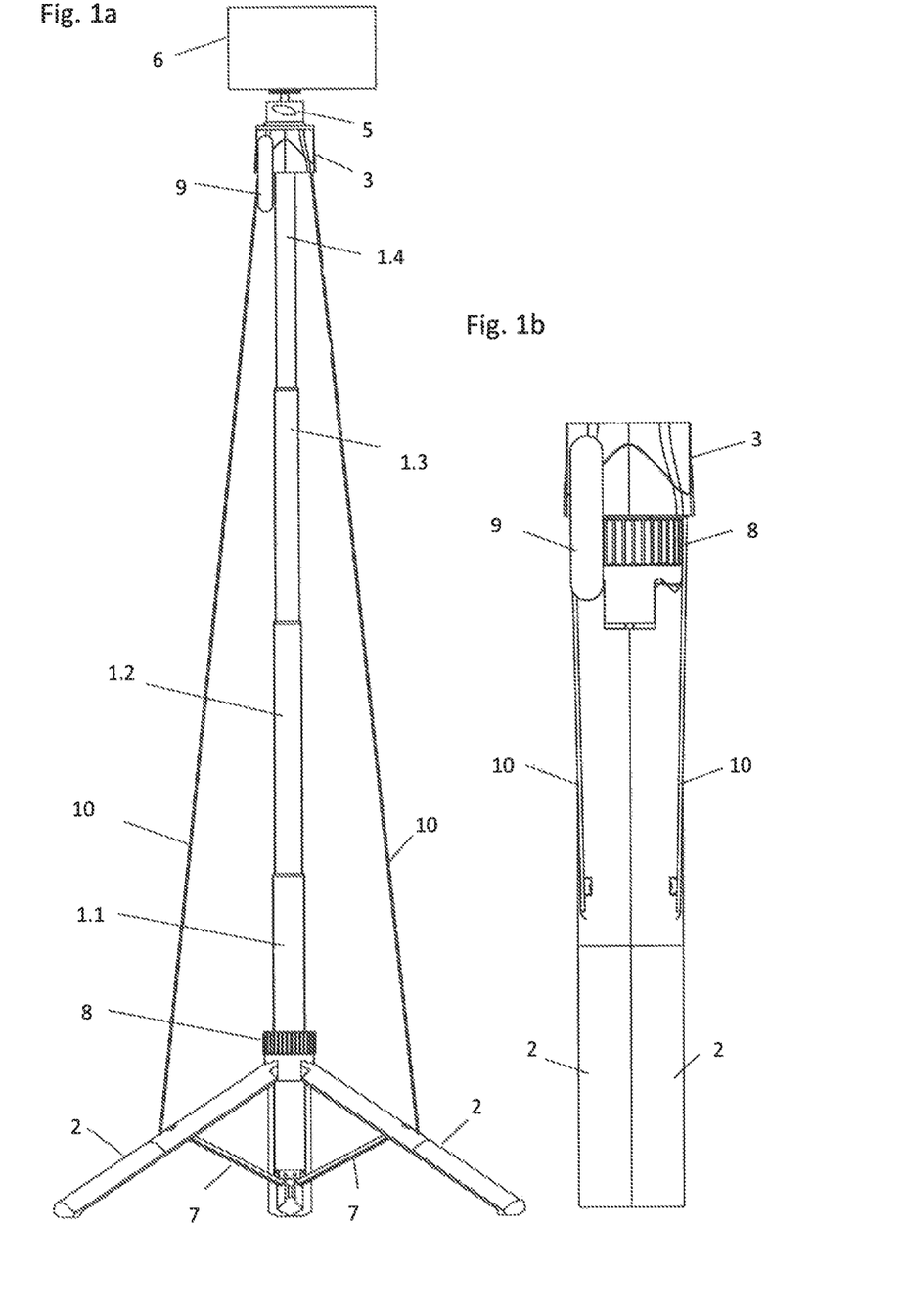
FIG. 1a shows a side view of an embodiment of a tripod according to the invention with pivot head and mounted equipment with telescopic tube extended.
FIG. 1b shows a side view of an embodiment of a tripod according to the invention without pivot head and without mounted equipment with telescopic tube inserted.

First, reference is made to FIG. 1, which shows a side view of an embodiment of a tripod according to the invention with a shaft 1 designed as a central telescopic tube in the extended state (FIG. 1a) and in the inserted state (FIG. 1b).

The structure of the telescopic tube will be described in more detail in the following, at this point it should only be mentioned that the telescopic tube is formed by an outer telescopic assembly and an inner telescopic assembly, wherein in FIG. 1 only the shaft parts 1.1, 1.2, 1.3 and 1.4 of the outer telescopic assembly are visible, which are also referred to in the following as the outer shaft parts 1.n. The shaft parts 1.5, 1.6 and 1.7 of the inner telescopic assembly, which are subsequently also referred to as inner shaft parts 1.m, are arranged within the outer telescopic assembly and can therefore not be seen in FIG. 1.

A tripod head 3 is attached to the tripod, which can also have a tripod connection for a pivot head 5, on which the equipment 6 is attached and with which the equipment 6 can be pivoted more easily relative to the tripod. On the outermost shaft part 1.1, three support legs 2 can be pivoted out and in the embodiment example shown are also displaceably mounted. When pivoted out according to FIG. 1a, struts 7 are also visible which additionally connect the support legs 2 to the outermost shaft part 1.1. When pivoting out the support legs 2, a central fastening ring 8 also slides along the outermost shaft part 1.1 with respect to FIG. 1a downwards. The swing-out angle of the support legs 2 is limited by a stop, which in the embodiment example shown is achieved by locking the fastening ring 8 in combination with the struts 7. As soon as the fastening ring 8 can no longer be moved axially, the angle of attack of the support legs 2 can no longer be changed. When pivoting in the support legs 2, the central fastening ring 8 on the outermost shaft part 1.1 slides upwards in relation to FIG. 1a, where it can be locked against the outermost shaft part 1.1, if necessary, to ensure a safe bearing position of the support legs 2 on the outermost shaft part 1.1.

FIG. 1 also shows the actuating lever 9, the function of which will be explained in more detail below. Furthermore, the pulling members 10 are visible, which run diagonally outside from the tripod head 3 to the support legs 2 in the extended position of the telescopic tube and brace each of the legs 2 with the tripod head 3. The pulling members 10 are roughly designed as ropes and can brace the legs 2 in their swung-out position because the legs 2 have a swing-out angle limited by a stop. The tensioning of the pulling members 10 is explained in the following sequence using FIGS. 2 to 5.

Figure 2:
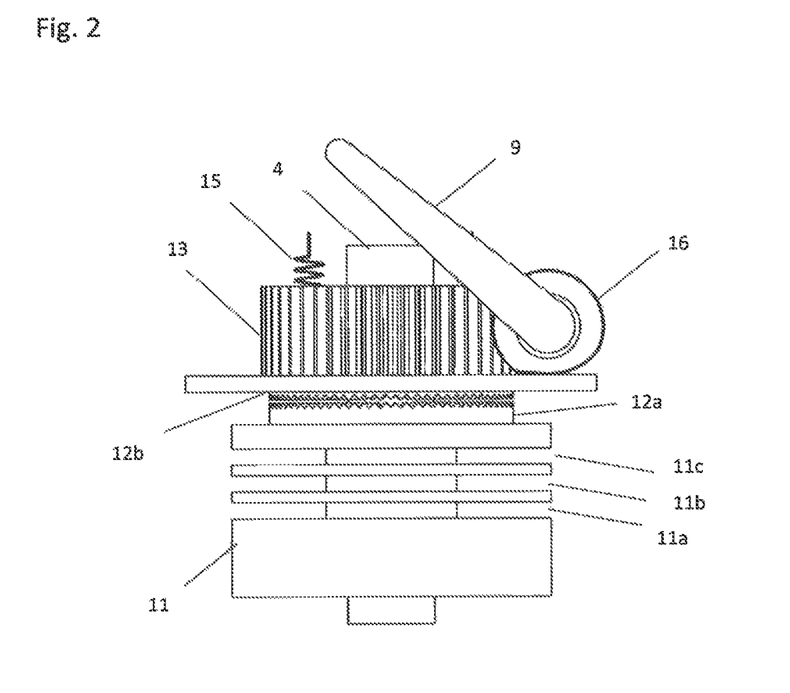
FIG. 2 shows an embodiment of the coupling mechanism and the tensioning element designed as an actuating lever in rotation mode.

FIGS. 2 to 5 show an embodiment of the coupling mechanism and the tensioning element designed as actuating lever 9. The pulling members 10 can be wound up and unwound by means of a coil 11 arranged on the tripod head 3 and rotatable about a coil shaft 4, wherein a separate coil area 11a, 11b, 11c is provided for each of the three pulling members 10. Coil 11 is equipped with a return spring acting in the winding direction of rotation of coil 11 (not shown in FIG. 2 to 5), which can be designed as a torsion spring. When the pulling members 10 are unwound, the return spring is tensioned. During the relief of the tension, the return spring thus produces a winding process of the pulling members 10 onto the coil 11. Above the coil 11 is the coupling mechanism, which comprises a first coupling part 12a, which is fastened to the coil 11, a second coupling part 12b, which is fastened to a gearwheel 13 in the form of a spur gear, and a shaft 14 provided with a screw thread, which meshes with the gearwheel 13 and can be rotated via the actuating lever 9 (see FIG. 5). The gearwheel 13 is arranged coaxially to the coil 11. The shaft 14 provided with a screw thread and the gearwheel 13 preferably form a globoid worm gear. In a globoid worm gear, the shaft 14 formed as a worm has a globoidal shape and the gearwheel 13 designated as a worm gear is cylindrical so that the gearwheel 13 is axially displaceable. However, the gearwheel 13 and thus also the second coupling part 12*b* are held in a position in which the second coupling part 12*b* is at a distance from the first coupling part 12*a* by means of a restoring element 15, which is designed, for example, as a spring element (FIG. 2).

An eccentric disk 16 is fastened coaxially to shaft 14, which is provided with a screw thread, which when the actuating lever 9 is pivoted, the eccentric disk is thus co-rotated with the shaft 14. The eccentric disk 16 lies with its circumferential region against the second coupling part 12*b*, or can be brought into abutment with the second coupling part 12*b* when the actuating lever 9 is pivoted, wherein by pivoting the actuating lever 9 and the resulting rotary movement of the eccentric disk 16, the second coupling part 12*b* can be brought from a position spaced from the first coupling part 12*a*, which corresponds to the rotation mode (see FIG. 2), into a positive or non-positive connection with the first coupling part 12*a*, which corresponds to the tensioning mode (see FIGS. 3 and 4). The eccentric disk 16 loads the second coupling part 12*b* and moves it in an axial direction against the restoring force of the restoring element 15, so that the second coupling part 12*b* comes into positive or non-positive contact with the first coupling part 12*a* and is held there (see FIGS. 3 and 4). In the rotation mode of the coupling mechanism, the second coupling part 12*b* is therefore not in contact with the first coupling part 12*a*, so that coil 11 can be freely rotated independently of gearwheel 13 and shaft 14. In the tensioning mode of the coupling mechanism, the second coupling part 12*b* is in contact with the first coupling part 12*a*, so that the coil 11 is locked by the self-locking worm gear. However, the coil 11 rotates in tensioning mode when the actuating lever 9 is pivoted with the gearwheel 13. This rotary movement of the coil 11 is used to wind the pulling members 10 onto the coil 11 and to thus tension them. The actuating lever 9 thus also acts as a tensioning element. A simple actuation of actuating lever 9 can be used to switch between rotation mode and tensioning mode as well as to tension and relieve the pulling members 10.

An additional simplification is achieved in that the locking of the shaft parts 1.*n*, 1.*m* of the telescopic tripod can also be achieved from the tripod head 3, as now explained on the basis of FIGS. 6 to 9. For this purpose, a locking mechanism for shaft 1, which can be actuated by rotating shaft parts 1.*n*, 1.*m* about their shaft axis, is provided. This locking mechanism is also operated by the actuating lever 9. When the actuating lever 9 is pivoted, a rotation of the gearwheel 13 is brought about as mentioned above, which can now be used to bring about a rotation of the inner shaft parts 1.*m* around their shaft axis and thus to operate the locking mechanism.

Figure 6:
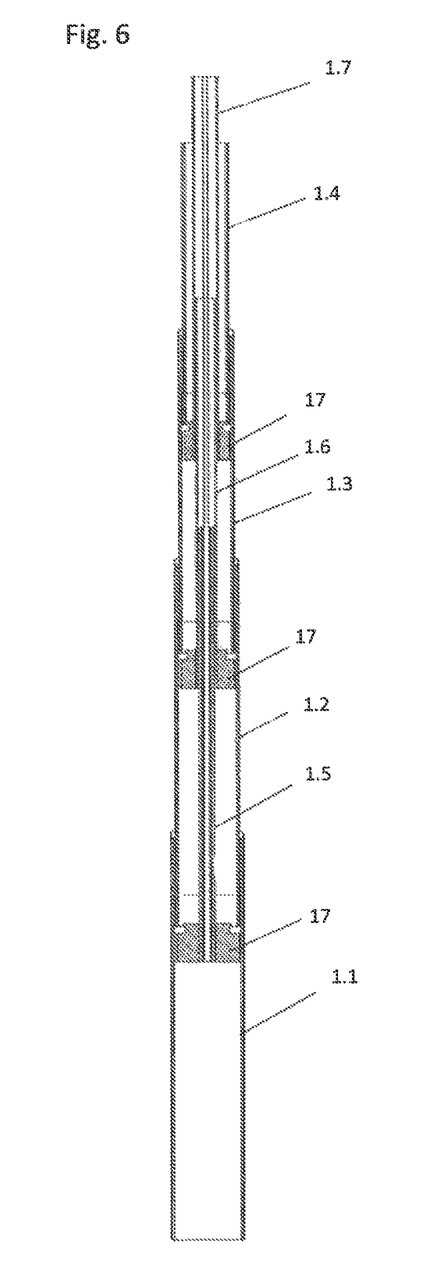
FIG. 6 shows an embodiment of the shaft with inner telescopic assembly and outer telescopic assembly in the extended state of the shaft.
Figure 7:
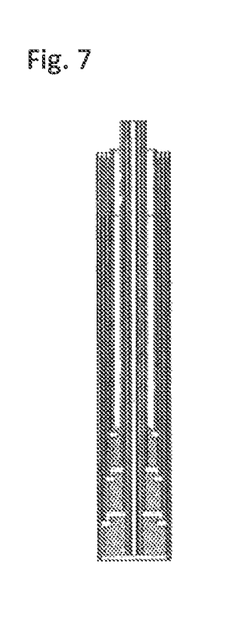
FIG. 7 shows an embodiment of the shaft of FIG. 6 in the inserted state of the shaft.
Figure 8:
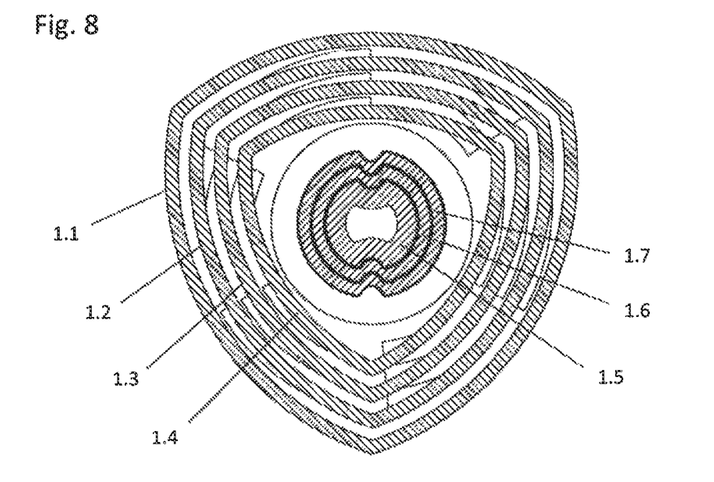
FIG. 8 shows a sectional view of the shaft of FIGS. 6 and 7 in the inserted state.

For this purpose, a new design of the telescopically extendable and collapsible shaft is proposed. This new design is characterized in that the shaft has an inner telescopic assembly, which in the embodiment example shown in FIGS. 6 to 8 is formed from three inner shaft parts 1.*m* which can be telescopically extended and pushed together and are connected to each other in a rotationally fixed manner, and an outer telescopic assembly, which in the example shown in FIGS. 6 to 8 is formed from four outer shaft parts 1.*n* which can be telescopically extended and pushed together and are connected to each other in a rotationally fixed manner, wherein the inner telescopic assembly is arranged within the innermost shaft part 1.4 of the outer telescopic assembly. The locking mechanism further comprises clamping elements 17, which are each connected in a rotationally fixed manner to the inner shaft parts 1.*m* and can be frictionally engaged with an inner surface of an outer shaft part 1.*n* in a locking direction of rotation about the shaft axis. The inner telescopic assembly can be rotated relative to the outer telescopic assembly around the common shaft axis. If, for example, the outermost shaft part 1.7 of the inner telescopic assembly is twisted about the shaft axis, the entire inner telescopic assembly twists due to the rotationally fixed connection of the inner shaft parts 1.*m* relative to the shaft parts 1.*n* of the outer telescopic assembly. This rotary movement can be used to bring the clamping elements 17, which are each connected to the inner shaft parts 1.*m* in a rotationally fixed manner, in a locking direction of rotation about the shaft axis into a frictional engagement with an inner surface of an outer shaft part 1.*n*. Each of the shaft parts 1.*m* of the inner telescopic assembly is provided with a clamping element 17, which can be brought into frictional engagement with a shaft part 1.*n* of the outer telescopic assembly assigned to it.

In addition, it is preferably proposed that such a clamping element, which can be brought into frictional engagement with an inner surface of an outer shaft part 1.*n*, is attached to the closest inner outer shaft part 1.*n* so as to be rotatable about the shaft axis. The two telescopic assemblies are usually pushed out and pushed together by the outer telescopic assembly. If the shaft parts 1.*n* of the outer telescopic assembly are moved axially, the clamping elements 17 and thus the shaft parts 1.*m* of the inner telescopic assembly are also moved. However, the clamping elements 17 can still rotate relative to the closest inner outer shaft part 1.*n* during a locking rotational movement produced by the shaft parts 1.*m* of the inner telescopic assembly, in order to bring it into frictional engagement with an inner surface of the next outer shaft part 1.*n*.

Figure 9:
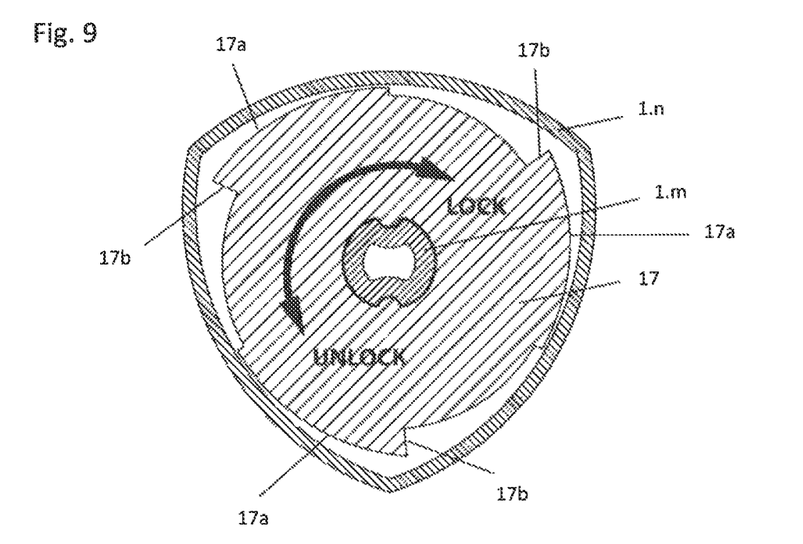
FIG. 9 shows an embodiment of the clamping element for a shaft according to the embodiment of FIGS. 6 to 8.

With regard to the design of the clamping elements 17, it is preferably proposed that the inner surfaces of the outer shaft parts 1.*n* are convexly curved outwards (see FIGS. 8 and 9) and that the clamping elements 17 are each designed as eccentric clamping elements with convex eccentric regions 17*a*, which can be brought into frictional engagement with the inner surface of an outer shaft part 1.*n* in a locking direction of rotation about the shaft axis and which can be released again in the opposite direction of rotation (see FIG. 9). The convex eccentric areas 17*a* can end in this opposite direction of rotation with a radially rebounding stop shoulder 17*b* to prevent a locking frictional engagement with the inner surface of an outer shaft part 1.*n* in this direction of rotation.

An embodiment of a clamping element 17 is shown in FIG. 9. It is disk-shaped and has convex eccentric areas 17*a* in its circumferential progression, which run between a minimum and a maximum diameter, measured from the shaft axis. The clamping element 17 is formed in the illustrated embodiment by six sectors, three of which are circular sectors, the arcs of which lie on an inner circle, and three of which have an arc which lies outside the inner circle and the distance of which to the center of the inner circle varies from a minimum to a maximum distance in order to form the convex eccentric regions 17*a*.

The convex inner surfaces of the outer shaft parts 1.*n* can be designed in such a way that they appear triangular in cross-section with outwardly bent sides (see FIGS. 8 and 9), which can each be described by circular arcs whose diameter is greater than the maximum diameter of the clamping element 17. In borderline cases, the curvature can also disappear, so that the inner surfaces of the outer shaft parts 1.*n* appear triangular in cross-section. The minimum distance of an inner surface of an outer shaft part 1.*n* from the shaft axis is in any case greater than the minimum diameter and smaller than the maximum diameter of the eccentric regions 17*a* of the clamping element 17. When the clamping element 17 is rotated about the shaft axis, this results in frictional engagement with the inner surface of the outer shaft part 1.*n*.

The operation of the tripod according to the invention is now carried out as follows. In the storage state, the central telescopic tube is in the inserted state. The actuating lever 9 is in tensioning mode according to FIG. 4 and the fastening ring 8 is locked against the outermost shaft part 1.1. This prevents the telescopic tube from being pushed out unintentionally. The pulling members 10 are wound on the coil 11.

To use the tripod, the fastening ring 8 is now released and the actuating lever 9 is pivoted into the rotation mode according to FIG. 2. The second coupling part 12*b* is thus lifted from the first coupling part 12*a* by means of the restoring element 15, which makes the coil 11 freely rotatable around the shaft axis. In addition, the lock of the outer telescopic assembly is released relative to the inner telescopic assembly. This allows the outer shaft parts 1.*n* to be pulled apart. The inner shaft parts 1.*m* are also pulled apart via the clamping elements 17. The support legs 2 pivot out and reach a maximum pivot-out position defined by the fastening ring 8 and the struts 7. The pulling members 10 are unwound from coil 11, which tensions the return spring of coil 11. The tripod can then be adjusted to the desired height.

Figure 3:
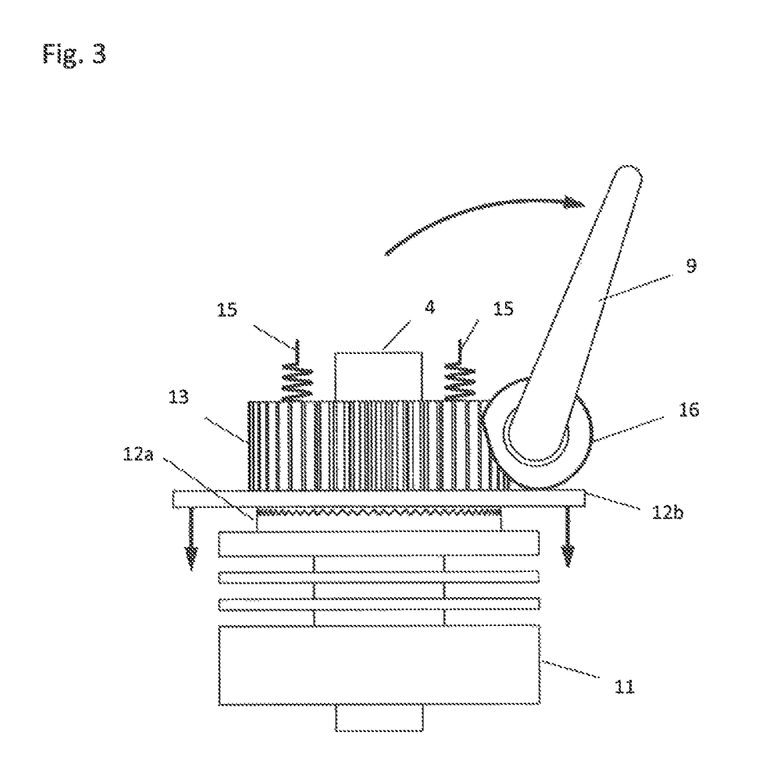
FIG. 3 shows an embodiment of the coupling mechanism and the tensioning element after completion of a first pivoting range by the actuating lever and thus termination of the rotation mode and at the beginning of the tensioning mode.
Figure 4:
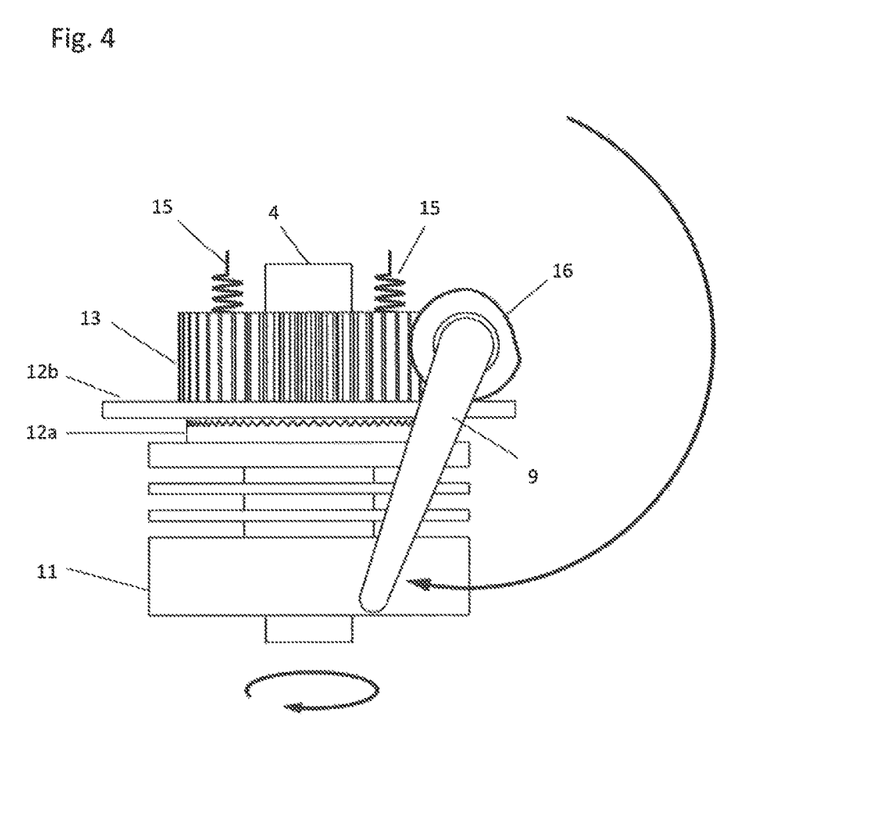
FIG. 4 shows an embodiment of the coupling mechanism and the tensioning element in tensioning mode after completion of a second pivoting range by the actuating lever.
Figure 5:
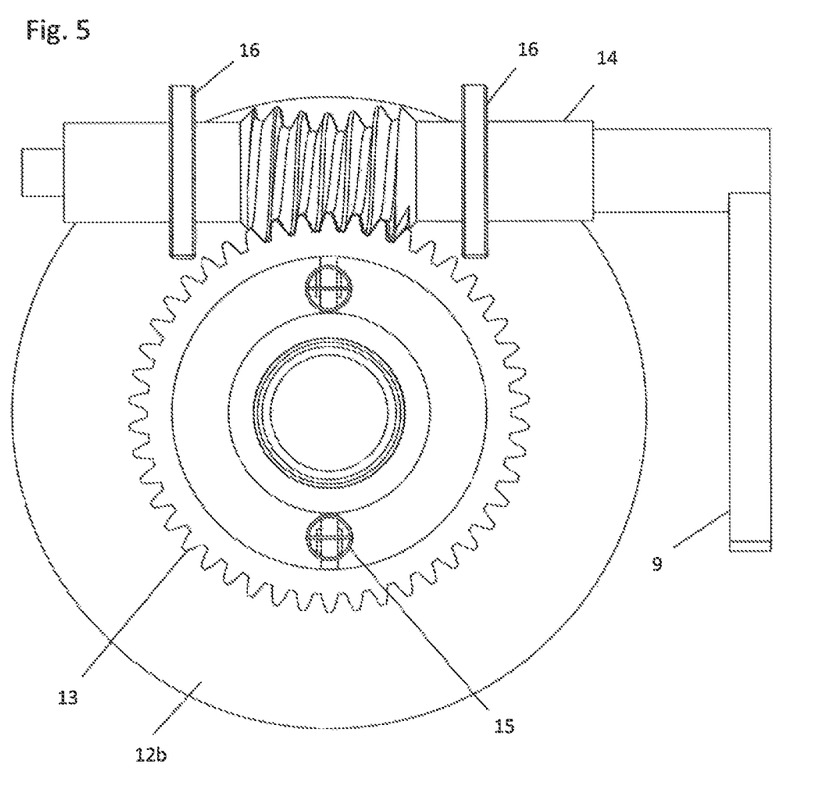
FIG. 5 shows a diagram of the actuating lever and the coupling mechanism seen from above.

At the desired height the actuating lever 9 can be pivoted from rotation mode to tensioning mode according to the pivoting movement shown in FIGS. 3 and 4. On the one hand, the inner telescopic assembly is locked against the outer telescopic assembly and, on the other hand, the eccentric disk 16 is used to bring the second coupling part 12*b* into contact with the first coupling part 12*a*, so that a free rotational movement of the coil 11 is prevented and, subsequently, the coil 11 is moved in the winding direction of rotation. Since the telescopic tube is already locked and the support legs 2 have reached their maximum pivot-out position, the pulling members 10 can be tensioned as a result. In this way, the tripod is stabilized by tensioning the pulling members 10 and assumes the structure as shown in FIG. 1. It should be noted that it is also possible to prevent the legs 2 from pivoting out manually, for example to be able to use the tripod as a monopod ("Monopod" or "Selfie stick").

To remove the tripod again, the actuating lever 9 is pivoted back into the rotation mode according to FIG. 2. The pulling members 10 are unwound from the coil 11 and thus relaxed. In addition, the positive locking between the first coupling part 12*a* and the second coupling part 12*b* is released, so that the coil 11 can rotate freely again. The telescopic tube can now be pushed in, wherein the support legs 2 are again put on the outermost shaft part 1.1. The inner shaft parts 1.*m* are inserted via the clamping elements 17. Using the return spring of coil 11, the pulling members 10 are rewound onto coil 11. As soon as the telescopic tube has been fully inserted, the fastening ring 8 can be locked and the actuating lever 9 can be pivoted back into the tensioning mode according to FIG. 4.

This greatly simplifies the operation of the tripod, as the actuating lever 9 both locks the telescopic tube and tensions the pulling members 10. The construction is simple and guarantees small packing size as well as low weight.

LIST OF REFERENCE NUMERALS

1 Shaft
1.*n* Outer shaft parts
1.*m* Inner shaft parts
2 Support legs
3 Tripod head
4 Coil shaft
5 Pivot head
6 Equipment
7 Struts
8 Fastening ring
9 Actuating lever
10 Pulling members
11 Coil
12*a* First coupling part
12*b* Second coupling part
13 Gearwheel
14 Shaft
15 Restoring element
16 Eccentric disk
17 Clamping elements
17*a* Convex circumferential areas
17*b* Stop shoulder

The invention claimed is:

1. A tripod comprising:
a tripod head for fastening equipment;
a shaft, which is fastened to the tripod head, is formed from at least two telescopically extendable and collapsible shaft parts configurable to an adjusted length;
a locking mechanism configured to lock the shaft to the adjusted length;
at least three support legs mounted so as to be outwardly pivotable on the shaft;
pulling members coupled to the at least three support legs;
a rotatable coil arranged to wind up and unwind the pulling members;
a tensioning element arranged to tension the pulling members;
a return spring coupled to the rotatable coil to act in a winding direction of the rotatable coil; and
a coupling mechanism positionable into a rotation mode, in which the rotatable coil is rotated by a pulling action of the pulling members in an unwinding direction of rotation and by the return spring in the winding direction of rotation, and into a tensioning mode, in which the rotatable coil is locked with respect to the pulling members and the pulling members are tensioned by the tensioning element.

2. The tripod according to claim 1, wherein, in the tensioning mode, the pulling members are tensioned by the tensioning element acting in the winding direction of rotatable coil.

3. The tripod according to claim 2, wherein the tensioning element is designed as an actuating lever for a shaft with at least one screw thread that meshes with a gearwheel, wherein the gearwheel is arranged coaxially with the rotatable coil.

4. The tripod according to claim 3, wherein a gear formed by the shaft with the at least one screw thread and the gearwheel is a globoidal worm gear.

5. The tripod according to claim 3, wherein the coupling mechanism comprises a first coupling part, which is fastened to the rotatable coil, and a second coupling part, which is fastened to the gearwheel and is displaceable with the gearwheel along an axis of the rotatable coil,
wherein the second coupling part is spaced apart from the first coupling part in the rotation mode and is transferable into the tensioning mode by an operating element against a restoring force of a restoring element, in which the second coupling part rests positively or non-positively against the first coupling part.

6. The tripod according to claim 5, wherein an eccentric disk is arranged coaxially with the shaft with at least one screw thread, said eccentric disk being at least one of rotatable with the actuating lever and resting with a circumferential region against the second coupling part or adapted to rest against the second coupling part upon pivoting of the actuating lever,
- wherein the second coupling part is moved from a distance from the first coupling part, which corresponds to the rotation mode, into a positive or non-positive connection with the first coupling part, which corresponds to the tensioning mode, by pivoting the actuating lever to rotatably move the eccentric disk.

7. The tripod according to claim 1, wherein the rotatable coil is arranged coaxially to an axis of the shaft.

8. The tripod according to claim 1, wherein the shaft parts have axes about which they are rotatable and the locking mechanism is actuatable by rotation of the shaft parts about the axes.

9. The tripod according to claim 8, wherein the rotation of the shaft parts about the axes is effected by a locking element arranged on the tripod head.

10. The tripod according to claim 6, wherein a locking element comprises the actuating lever.

11. The tripod according to claim 1, wherein the shaft comprises an inner telescopic assembly which is formed from inner shaft parts and an outer telescopic assembly, which is formed from outer shaft parts which are telescopically pulled out and pushed together and which are connected to one another in a rotationally fixed manner,
- wherein the inner telescopic assembly is arranged inside an innermost shaft part of the outer telescopic assembly, and the locking mechanism comprises clamping elements which are each connected in a rotationally fixed manner to the inner shaft parts and brought into frictional engagement with an inner surface of one of the outer shaft parts in a locking direction of rotation about the shaft axis.

12. The tripod according to claim 11, wherein a clamping element brought into frictional engagement with the inner surface of an outer shaft part is fastened to a closest inner outer shaft part so as to be rotatable about the shaft axis.

13. The tripod according to claim 11, wherein the inner surfaces of the outer shaft parts are convexly curved outwards and the clamping elements are each designed as eccentric clamping elements with convex circumferential regions which are brought into frictional engagement with the inner surface of one of the out shaft parts in the locking direction of rotation about the shaft axis and which are released again in an opposite direction of rotation.

* * * * *